(12) United States Patent
Easter

(10) Patent No.: US 6,864,429 B2
(45) Date of Patent: Mar. 8, 2005

(54) SEMICONDUCTIVE COMPOSITIONS AND CABLE SHIELDS EMPLOYING SAME

(75) Inventor: Mark R. Easter, Indianapolis, IN (US)

(73) Assignee: General Cable Technologies Corporation, Highland Heights, KY (US)

( * ) Notice: Subject to any disclaimer, the term of this patent is extended or adjusted under 35 U.S.C. 154(b) by 0 days.

(21) Appl. No.: 10/016,514

(22) Filed: Dec. 17, 2001

(65) Prior Publication Data

US 2003/0111253 A1 Jun. 19, 2003

(51) Int. Cl.$^7$ ............................ H01B 7/00; B32B 15/00
(52) U.S. Cl. ............................ 174/110; 174/110 SR; 428/379
(58) Field of Search ............................ 174/36, 110 R, 174/110 SC, 110 PM, 110 D, 110 FC, 102 SC, 102 R, 113 R, 102 P

(56) References Cited

U.S. PATENT DOCUMENTS

| | | | |
|---|---|---|---|
| 3,849,333 A | | 11/1974 | Lloyd et al. |
| 3,935,042 A | * | 1/1976 | Wahl ............................ 156/56 |
| 4,305,846 A | | 12/1981 | Jennings |
| 4,361,723 A | * | 11/1982 | Hvizd et al. ............ 174/102 SC |
| 4,412,938 A | * | 11/1983 | Kakizaki et al. ............ 252/511 |
| 4,470,898 A | * | 9/1984 | Penneck et al. ............ 252/511 |
| 4,526,707 A | * | 7/1985 | Kutsuwa et al. ............ 252/511 |
| 4,588,855 A | * | 5/1986 | Kutsuwa et al. ...... 174/120 SC |
| 4,612,139 A | | 9/1986 | Kawasaki et al. |
| 4,857,232 A | | 8/1989 | Burns, Jr. |
| 5,246,783 A | * | 9/1993 | Spenadel et al. ............ 428/461 |
| 5,877,250 A | | 3/1999 | Sant |
| 5,889,117 A | | 3/1999 | Flenniken |
| 6,086,792 A | * | 7/2000 | Reid et al. ............ 252/511 |
| 6,165,387 A | * | 12/2000 | Gustafsson et al. ........ 252/511 |
| 6,270,856 B1 | * | 8/2001 | Hendewerk et al. ........ 427/487 |
| 6,416,860 B1 | * | 7/2002 | Gustafsson et al. ........ 428/383 |
| 6,521,695 B1 | * | 2/2003 | Peruzzotti et al. ........ 524/505 |

FOREIGN PATENT DOCUMENTS

| | | | | |
|---|---|---|---|---|
| EP | 0 962 944 A1 | * | 3/1999 | ............ H01B/1/24 |
| GB | 1 501 967 | | 2/1978 | |
| GB | 1 564 080 | | 4/1980 | |
| JP | 3-173011 A | * | 7/1991 | ............ H01B/9/02 |
| SE | WO 98/14516 A | * | 4/1998 | ............ H01B/1/24 |
| SE | WO 99/20690 A | * | 4/1999 | ............ H01B/1/24 |

* cited by examiner

Primary Examiner—William H. Mayo, III
(74) Attorney, Agent, or Firm—Blank Rome LLP

(57) ABSTRACT

Novel semiconducting compositions for use in semiconductive cable shields having improved electrical properties as measured by ACLT and AWTT are described. The composition contains a base polymer and about 25 percent to about 45 percent by weight of carbon black having particle size of from about 15 nm to about 22 nm, Iodine number of from about 115 mg/g to about 200 mg/g, and DBP number of from about 90 cm$^3$/100 g to about 170 cm$^3$/100 g.

15 Claims, No Drawings

SEMICONDUCTIVE COMPOSITIONS AND CABLE SHIELDS EMPLOYING SAME

FIELD OF THE INVENTION

The present invention relates compositions useful in the preparation of semiconductive conductor shields in power cables and to semiconductive conductor shields and power cables utilizing the composition.

DESCRIPTION OF THE RELATED ART

A typical insulated electric power cable generally comprises a conductor in a cable conductive core that is surrounded by several layers of polymeric materials including an inner semiconducting shield layer (conductor or strand shield), an insulating layer, an outer semiconducting shield layer (insulation shield), a metallic wire or tape shield used as the ground phase, and a protective jacket. Additional layers within this construction such as moisture impervious materials, are often incorporated. The invention pertains to the inner semiconducting shield layer, i.e., the conductor shield.

Semiconductive shields have been used in power cables as shields for the cable conductor and insulation for many years. The conductor shield is typically extruded over the cable conductor to provide a layer of intermediate conductivity between the conductor and cable insulation in the power cable. Conventional compositions for these conductor shields include a base polymer as the predominant component of the composition compounded with carbon black to provide conductivity for the composition and may include various additives.

The primary purpose of the semiconducting conductor shield between the conductor and insulation in an electrical power cable is to ensure the long term viability of the primary insulation. There is always a need for improved semiconductive conductor shield compositions that balance cost and performance.

Examples of polymer compositions used as shields in power cables are found in the disclosures of U.S. Pat. Nos. 4,612,139 and 4,305,846 to Kawasaki et al.; U.S. Pat. No. 4,857,232 to Burns, Jr.; U.S. Pat. No. 3,849,333 to Lloyd et al.; U.S. Pat. No. 5,889,117 to Flenniken; and U.S. Pat. No. 6,086,792 to Reid et al.

U.S. Pat. No. 6,086,792 to Reid et al. discloses a semiconducting composition comprising an olefinic polymer and a carbon black with a particle size of at least 29 nm.

WO 01/40384 discloses carbon blacks and semiconducting compositions where the carbon black has a particle size 22–39 nm, an Iodine Number from about 64 to about 120 mg/g and a tinting strength of about 90% or less.

U.S. Pat. No. 5,877,250 to Sant discloses carbon black and polymers containing carbon black, wherein the carbon black has a particle size not greater than 20 nm and an Iodine Number of 64–112 mg/g. It is disclosed that improved processability is imparted by the use of the particular carbon black, although the use of such a carbon black to manufacture a semiconductive composition is not disclosed.

It would be desirable to have a conductor shield material with improved performance that does not require the use of expensive conductive carbon blacks, as performance must always be balanced with cost in the manufacture of electric cable.

SUMMARY OF THE INVENTION

The invention provides a conductor shield material with both low cost and improved performance. In particular, the composition of the invention, conductor shields and cables made with conductor shields in accordance with the invention exhibit superior performance over time as demonstrated by AWTT (Accelerated Water Treeing Test) values as well as improved accelerated cable life testing (ACLT) values as compared to conductor shield compositions using conventionally available carbon blacks.

An embodiment of the present invention relates a cable comprising a conductive core and at least one semiconducting layer surrounding the conductive core, said at least one semiconducting layer comprising a) about 55 percent to about 75 by weight of a base polymer; and b) about 25 percent to about 45 percent by weight of carbon black having particle size from about 15 nm to about 22 nm, an Iodine number of from about 115 mg/g to about 200 mg/g, and a DBP number of from about 90 cm$^3$/100 g to about 170 cm$^3$/100 g.

The present invention also relates to a semiconductive composition comprising:

a) about 55 percent to about 75 by weight of a base polymer; and b) about 25 percent to about 45 percent by weight of carbon black having a particle size of from about 15 nm to about 22 nm, an Iodine number of from about 115 mg/g to about 200 mg/g, and a DBP number of from about 90 cm$^3$/100 g to about 170 cm$^3$/100 g.

In preferred embodiments, the carbon black may have one or more of a particle size from about 18 nm to about 21 nm, an Iodine number of from about 120 mg/g to about 150 mg/g and a tint strength of at least about 95%.

Methods of making the cable and the semiconductive material are also provided by the present invention.

DETAILED DESCRIPTION OF THE PREFERRED EMBODIMENT

The present invention is based upon the discovery that certain carbon blacks, in combination with a polymer, can produce a semiconducting shield composition having enhanced electrical aging performance as measured by the accelerated water treeing test (AWTT) and the accelerated cable life test (ACLT). Carbon blacks used in the present invention have a particle size from about 15 to about 22 nanometers, preferably from about 18 nm to about 21 nm (as measured by ASTM D3849-89), an Iodine number from about 115 mg/g to about 200 mg/g, preferably from about 120 mg/g to about 150 mg/g (as measured by ASTM D 1510) and a DBP of from about 90 cm$^3$/100 g to about 170 cm$^3$/100 g, preferably from about 110 cm$^3$/100 g to about 150 cm$^3$/100 g (ASTM D2414).

Generally, the higher the DBP and Iodine number, the more conductive the carbon black. Carbon blacks with DBP below 90 and Iodine number below 85 usually are not conductive enough for semiconductive shields. A particularly preferred carbon black has a particle size of about 20 nanometers, an Iodine number of from about 125 to 140 mg/g and may also have a DBP of about 110 cm$^3$/100 g to about 120 cm$^3$/100 g.

The base polymer of the composition of the invention can be selected from a variety of polymers including various homopolymers, copolymers and terpolymers known in the art, the selection being based upon the ultimate desired use of the polymer composition. For example, the polymers used in the polymeric compositions of the present invention may include, but are not limited to, hormopolymers, copolymers and graft polymers of ethylene where the co-monomers are selected from butene, hexene, propene, vinyl acetate, acrylic acid, methacrylic acid, esters of acrylic acid, esters of methacrylic acid, maleic anhydride, half esters of maleic anhydride, carbon monoxide and the like; elastomers selected from natural rubber, polybutadiene, polyisoprene, random styrene butadiene rubber, polychloroprene, nitrile rubbers, ethylene propylene copolymers and terpolymers and the like; homopolymers and copolymers of styrene, including styrene-butadiene, styrene-butadiene-styrene linear and radial polymers, acrylonitrile-butadiene-styrene, styrene acrylonitrile and the like; linear and branched polyether or polyester polyols; crystalline and amorphous polyesters and polyamides; alkyd resins, rosin acids or rosin esters; hydrocarbon resins produced from thermal or Friedal Crafts polymerization of cyclic diene monomers such as dicyclopentadiene, indene, cumene and the like; ethylene/silane copolymers; ethylene/alpha-olefin/diene terpolymers such as ethylene/propylene/1,4-hexadiene, ethylene/1-butene/1,4-hexadiene and the like; and mixtures thereof.

Additionally, the polymer used in compositions of the present invention may include copolymers and terpolymers containing the above-identified polymers as major components of the copolymer or terpolymer.

Preferably, the base polymer of the composition of the invention is selected from a variety of polymers including copolymers of ethylene and a mono-unsaturated ester such as ethylene-ethyl acrylate, ethylene-methyl acrylate, ethylene-methyl methacrylate and ethylene-vinyl acetate; copolymers of ethylene and one or more alpha olefins having three to six carbon atoms; as well as ethylene/alpha-olefin/diene terpolymers such as ethylene/propylene/1,4-hexadiene, ethylene/1-butene/1,4-hexadiene and the like; and mixtures thereof, low density polyethylene (LDPE) and linear low density polyethylene (LLDPE), and mixtures of any of the preceding polymers and copolymers. More particularly, EVA (ethylene vinyl acetate) having a vinyl acetate content between 18 and 20% and ethylene/1-butene with a density of about 0.90 are preferred for use as the base polymer of the invention. Preferably, the polymer is present in an amount from about 55% to about 75% by weight.

In the present invention, carbon black is added to the polymer compositions to impart semi-conductive properties to the composition. Preferably the carbon black is present in an amount of from about 25% to about 45% by weight, based on the weight of the total composition.

A number of compounds have been suggested for use as additives in semiconducting shield compositions. Typically, these compounds fall into the categories of antioxidants, curing agents, vulcanizing agents, crosslinking agents, boosters and retardants, processing aids, pigments, dyes, colorants, fillers, coupling agents, ultraviolet absorbers or stabilizers, antistatic agents, nucleating agents, slip agents, plasticizers, lubricants, viscosity control agents, tackifiers, anti-blocking agents, surfactants, extender oils, acid scavengers, and metal deactivators.

Antioxidants can be, but are not limited to, hindered phenols such as tetrakis[methylene(3,5-di-tert-butyl-4-hydroxyhydro-cinnamate)]methane; bis[(beta-(3,5-ditert-butyl-4-hydroxybenzyl)-methylcarboxyethyl)]sulphide; 4,4'-thiobis(2-methyl-6-tert-butylphenol); 4,4'-thiobis(2-tert-butyl-5methylphenol); 2,2'-thiobis(4-methyl-6-tert-butylphenol); thiodiethylene bis(3,5-di-tert-butyl-4-hydroxy)hydrocinnamate; phosphites; and phosphonites such as tris(2,4-di-tert-butylphenyl)phosphite and di-tert-butylphenyl-phosphonite; thio compounds such as dilaurylthiodipropionate, dimyristylthiodipropionate, and distearylthiodipropionate; various siloxanes; polymerized 2,2,4-trimethyl-1,2-dihydroquinoline (TMQ); n,n'-bis(1,4-dimethylpentyl-p-phenylenediamine); alkylated diphenylamines; 4,4'-bis(alpha, alpha-demthylbenzyl) diphenylamine; diphenyl-p-phenylenediarmine; mixed di-aryl-p-phenylenediamines; and other hindered amine antidegradants or stabilizers. Antioxidants can be used in amounts of about 0.1 to about 5 percent by weight based on the weight of the composition.

Curing/crosslinking agents can be, but are not limited to, dicumyl peroxide; bis(alpha-t-butyl peroxyisopropyl) benzene; isopropylcumyl t-butyl peroxide; t-butylcumylperoxide; di-t-butyl peroxide; 2,5-bis(t-butylperoxy)2,5-dimethylhexane; 2,5-bis(t-butylperoxy)2,5-dimethylhexyne-3; 1,1-bis(t-3,3,5-trimethylcyclohexane; isopropylcumyl cumylperoxide; di(isopropylcumyl) peroxide; or mixtures thereof. Peroxide curing agents can be used in amounts of about 0.1 to 5 percent by weight based on the weight of the composition.

The polymer compositions of the present invention may be manufactured using conventional machinery and methods to produce the final polymer product. The compositions may be prepared by batch or continuous mixing processes such as those well known in the art. For example, equipment such as Banbury mixers, Buss cokneaders, and twin screw extruders may be used to mix the ingredients of the formulation. The components of the polymer compositions of the present invention may be mixed and formed into pellets for future use in manufacturing electrical cable.

The semiconducting shields and cables made in accordance with the present invention exhibit superior performance over time as demonstrated by AWTT testing good performance as demonstrated by accelerated cable life testing (ACLT) as compared to conventional high performance conductor shield compositions. Specifically, as described below in the Examples, the composition of the invention when used in a conductor shield may achieve an accelerated cable life testing Weibull Beta value of 1.5 or more, preferably 3.0 or more.

While the connection between smoothness of the conductor shield is frequently taught in the prior art to be related to the improved ACLT values, nonetheless, the composition of the invention, when used in a conductor shield, does not require any specific degree of smoothness to achieve the improved performance of the compositions and cables of the invention.

The following examples are given to illustrate the present invention. It should be understood that the invention is not to be limited to the specific conditions or details described in these examples. All temperatures in these examples are in ° C. and all percents are weight percents. DC resistivity was measured according to ASTM D991. Tint was measured according to ASTM D3265. Smoothness was measured with a Polycheck limited UNINOP laser smoothness measurement device. NSA/CTAB is the ratio of the Nitrogen Surface Area ($m^2/g$) and the CTAB surface area ($m^2/g$), measured by ASTM D3037 and D3765, respectively.

EXAMPLE 1

Accelerating Cable Life Test (ACLT)

Power cables were prepared with No. 2/7 wire stranded aluminum conductor surrounded by a 15 mil layer of a conductor shield having a composition as specified in Table 4, which was surrounded by a 175 mil layer of a cross-linked ethylene propylene rubber insulation material (General Cable designation EI 4728) and surrounded by a 35 mil layer of semiconductive insulation shield made from General Cable Corp LS566A resin. A copper mesh was then wrapped around the insulation shield to provide the ground path for the shortout in the ACLT test method. The conductor shield was extruded first, then the insulation and outer shield components were extruded over the conductor simultaneously on a Davis standard tandem extruder and dry cured under pressurized nitrogen in a continuous catenary vulcanization tube, and then water cooled.

The cables were then subjected to the following protocols. Samples were preconditioned for 72 hours at 90° conductor temperature in free air. The center of each sample was immersed in 50° water. The cable conductor temperature in the water was controlled to 75° for 8 hours during each 24 hour period. For the remaining 16 hours, the heating current was turned off. The samples were energized at four times normal voltage stress (34.6 kv).

EXAMPLE 2

Accelerated Water Treeing Test (AWTT)

The AWTT was performed according to the Association of Edison Illuminating Companies (AEIC) Specification CS6-87, Section L.

Power cables were prepared with a 1/0 19 wire stranded aluminum conductor surrounded by a 15 mil conductor shield having a composition as specified in Table 4 (percent by weight), surrounded by a 175 mil layer of cross-linked ethylene propylene rubber insulation (General Cable designation EI 4728) surrounded by a 35 mil layer of semiconductive insulation shield made from General Cable Corp LS566A. A copper mesh was then wrapped around the insulation shield to provide the ground path for the shortout in the AWTT test. The conductor shield was extruded first, then the insulation and outer shield components were extruded over the conductor simultaneously on a Davis standard tandem extruder and dry cured under pressurized nitrogen in a continuous catenary vulcanization tube, and then water cooled.

Table 1 provides the properties of the carbon blacks used in the conductor shields.

TABLE 1

CARBON BLACK COMPOSITIONS TESTED

| Carbon Black | Invention CB (ASTM N110) | CB 1 | CB 2 | CB 3 | CB 4 (ASTM N550) | CB 5 |
|---|---|---|---|---|---|---|
| Particle Size (nm) | 20 | 21 | 29 | 31 | 60 | 33 |
| Iodine No. (mg/g) | 136 | 254 | 85 | 63 | 44 | 81 |
| DBP No. ($CM^3/100$ g) | 125 | 170 | 102 | 125 | 123 | 98 |
| Tint | 120 | 86 | 106 | 80 | 55 | 76 |
| NSA/CTAB | <1.1 | <1.1 | <1.1 | <1.1 | <1.1 | >1.1 |

Table 2 shows the compositions of the conductor shields tested.

TABLE 2

SHIELDING COMPOSITIONS TESTED

| | Invention | Sample 1 | Sample 2 | Sample 3 | Sample 4 | Sample 5 |
|---|---|---|---|---|---|---|
| Base Polymer | 62.5%* | 62.5.5%* | 62.5.5* | 62.5* | 62.5* | 62.5* |
| Carbon Black | 36% Invention CB | 36% CB 1 | 36% CB 2 | 36% CB 3 | 36% CB 4 | 36% CB 5 |
| A/0 Agerite D, MA RT Vanderbilt | 0.5% | 0.5% | 0.5% | 0.5% | 0.5% | 0.5% |
| D 68 Peroxide, Hercules, Inc. | 1% | 1% | 1% | 1% | 1% | 1% |

*Ethylene/1-butene resin with a density of 0.903 and Mi of 27

Table 3 shows the resistivity of the shieldings depicted in Table 2.

TABLE 3

RESISTIVITY

| | Invention | Sample 1 | Sample 2 | Sample 3 | Sample 4 | Sample 5 |
|---|---|---|---|---|---|---|
| Resistivity (Ohm-cm) | 13 | 1 | 1007 | 6 | 15 | 10 |

Commercially available power cable semiconductive shielding compounds were also tested.

Table 4 shows the compositions of the invention and commercial shieldings tested. Samples 6, 7, and 8 are commercial shieldings. Sample 9 is a composition covered by the claims of U.S. Pat. No. 6,086,792.

TABLE 4

SHIELDING COMPOSITIONS TESTED

|  | Invention | Sample 6 | Sample 7 | Sample 8 | Sample 9 |
|---|---|---|---|---|---|
| Base Polymer | 59%* | ** | *** | **** | 59%* |
| Carbon Black | 39% Invention CB | 36% CB 1 | 40% CB 3 | 36% CB 4 | 39% CB 5 |
| A/0 Agerite D, RT Vanderbilt | 0.5% | — | 0.5% | 0.5% | 0.5% |
| Dicumyl Peroxide | 1.5% | — | 1.5% | 1.5% | 1.5% |

*Ethylene/1-butene resin with a density of 0.903 and Mi of 27
**Union Carbide 0581
***General Cable LS571E
****General Cable LS567

The additive levels in the Union Carbide 0581 shielding resin are not published.

Table 5 shows the results of AWTT and ACLT for the cables in Table 4.

TABLE 5

AWTT AND ACLT

|  | Invention | Sample 6 | Sample 7 | Sample 8 | Sample 9 |
|---|---|---|---|---|---|
| Smoothness | 2793 | 911 | 331 | 448 | 6092 |
| 120 Day AWTT Breakdown (V/ml) | 627/750/728 | 470/457/481 | 483/463/613 | N/T | N/T |
| ACLT days on test, no failures | 300 | N/T | 300 | N/T | N/T |

N/T = not tested.

The Examples and test results clearly demonstrate that the semiconductive shield material and cables of the invention achieve equivalent ACLT performance and improved AWTT performance while also enhancing cost performance by using lower cost materials heretofore not considered for these applications.

What is claimed is:

1. A cable comprising a conductive core and a semiconducting layer surrounding the conductive core, said semiconducting layer comprising:
   about 55 percent to about 75 by weight of a base polymer; and
   about 25 percent to about 45 percent by weight of carbon black having particle size of from about 15 nm to about 22 nm, an Iodine number of from about 115 mg/g to about 200 mg/g, and a DBP number of from about 90 cm³/100 g to about 170 cm³/100 g, wherein said cable has an accelerated cable life testing (ACLT) Weibull Beta value of 1.5 or more.

2. The cable of claim 1, wherein the particle size is from about 18 nm to about 21 nm.

3. The cable of claim 1, wherein the Iodine number is from about 120 mg/g to about 150 mg/g.

4. The cable of claim 1, wherein the tint strength is at least about 95%.

5. The cable of claim 1, wherein the particle size is about 20 nm and the Iodine number is from about 125 mg/g to about 150 mg/g.

6. The cable of claim 1, wherein the carbon black is present in an amount of from about 30 percent to about 40 percent by weight.

7. The cable of claim 1, wherein the base polymer is present in an amount of from about 60 percent to about 70 percent by weight.

8. The cable of claim 1, wherein the base polymer is selected from copolymers of ethylene and a mono-unsaturated ester, copolymers of ethylene and one or more α-olefins having three to six carbon atoms, EPR and EDPM rubbers, low density polyethylene, and linear low density polyethylene.

9. The cable of claim 1, wherein the base polymer is ethylene vinyl acetate.

10. The cable of claim 9, wherein the ethylene vinyl acetate has a vinyl acetate content of from about 18 percent to about 20 percent.

11. The cable of claim 1, wherein the base polymer is ethylene/I-butene and has a density of from about 0.85 g/cm³ to about 0.95 g/cm³.

12. A semiconducting composition comprising:
   about 55 percent to about 75 by weight of a base polymer; and
   about 25 percent to about 45 percent by weight of carbon black having a particle size from about 15 nm to about 22 nm, an Iodine number of from about 115 mg/g to about 200 mg/g, and a DBP number from about 90 cm³/100 g about 170 cm³/100 g, wherein a semiconductive shield made from the composition has an accelerated cable life testing (ACLT) Weibull Beta value of 1.5 or more.

13. The semiconducting composition of claim 12, wherein the Iodine number is from about 125 mg/g to about 150 mg/g.

14. The semiconducting composition of claim 12, wherein the tint strength is at least about 95%.

15. A semiconducting composition according to claim 12, wherein said semiconductive shield made from the composition has an accelerated cable life testing (ACLT) Weibull Beta value of 3.0 or more.

* * * * *